(12) United States Patent
Raindel et al.

(10) Patent No.: US 12,250,136 B2
(45) Date of Patent: *Mar. 11, 2025

(54) LINK FAULT ISOLATION USING LATENCIES

(71) Applicant: MICROSOFT TECHNOLOGY LICENSING, LLC, Redmond, WA (US)

(72) Inventors: Shachar Raindel, Redmond, WA (US); Jitendra D. Padhye, Redmond, WA (US); Avi William Levy, Redmond, WA (US); Mahmoud S. El Haddad, Newcastle, WA (US); Alireza Khosgoftar Monafared, Redmond, WA (US); Brian D. Zill, Redmond, WA (US); Behnaz Arzani, Redmond, WA (US); Xinchen Guo, West Lafayette, IN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/306,582

(22) Filed: Apr. 25, 2023

(65) Prior Publication Data
US 2023/0261960 A1    Aug. 17, 2023

Related U.S. Application Data

(60) Continuation of application No. 17/327,647, filed on May 21, 2021, now Pat. No. 11,671,342, which is a division of application No. 16/265,853, filed on Feb. 1, 2019, now Pat. No. 11,050,652.

(60) Provisional application No. 62/754,495, filed on Nov. 1, 2018.

(51) Int. Cl.
*H04L 43/106* (2022.01)
*H04L 41/00* (2022.01)
(Continued)

(52) U.S. Cl.
CPC ........ *H04L 43/106* (2013.01); *H04L 41/0631* (2013.01); *H04L 41/064* (2013.01);
(Continued)

(58) Field of Classification Search
CPC . H04L 43/106; H04L 41/0631; H04L 41/064; H04L 41/0677; H04L 41/30;
(Continued)

(56) References Cited

U.S. PATENT DOCUMENTS 11,050,652 B2 *   6/2021   Raindel ................... H04L 43/16
11,671,342 B2 *   6/2023   Raindel ............... H04L 41/0631
                                                              370/244

OTHER PUBLICATIONS

Statistical significance, 2024, [retrieved on Oct. 23, 2024], Retrieved from the Internet: URL: <https://www.britannica.com/science/confidence-interval>. (Year: 2024).*

(Continued)

*Primary Examiner* — Omar J Ghowrwal
(74) *Attorney, Agent, or Firm* — Han Gim; Newport IP, LLC

(57) ABSTRACT

Techniques are disclosed for identifying faulty links in a virtualized computing environment. Network path latency information is received for one or more network paths in the networked computing environment. Based on the network path latency information, a probable presence of a faulty component is determined. In response to the determination, physical links for a network path associated with the probable faulty component are identified. Information indicative of likely sources of the probable faulty component is received from multiple hosts of the networked computing environment. Based on the identified physical links and information, a faulty component is determined.

20 Claims, 8 Drawing Sheets

(51) Int. Cl.
 H04L 41/0631 (2022.01)
 H04L 41/0677 (2022.01)
 H04L 43/0817 (2022.01)
 H04L 43/16 (2022.01)
 H04L 45/02 (2022.01)
 H04L 41/40 (2022.01)
 H04L 43/0852 (2022.01)
 H04L 43/10 (2022.01)
 H04L 45/0377 (2022.01)

(52) U.S. Cl.
 CPC .......... H04L 41/0677 (2013.01); H04L 41/30 (2013.01); H04L 43/0817 (2013.01); H04L 43/16 (2013.01); H04L 45/02 (2013.01); H04L 41/40 (2022.05); H04L 43/0852 (2013.01); H04L 43/10 (2013.01)

(58) Field of Classification Search
 CPC ..... H04L 43/0817; H04L 43/16; H04L 45/02; H04L 41/40; H04L 43/0852; H04L 43/10; H04L 45/0377
 See application file for complete search history.

(56) References Cited

OTHER PUBLICATIONS

Statistical significance, 2024, [retrieved on Oct. 23, 2024], Retrieved from the Internet: URL: <https://en.wikipedia.org/wiki/Statistical_significance>. (Year: 2024).*

"Office Action Issued in European Patent Application No. 19805826.5", Mailed Date: Aug. 16, 2023, 7 Pages.

* cited by examiner

LINK FAULT ISOLATION USING LATENCIES

CROSS-REFERENCE TO RELATED APPLICATIONS

This application is a continuation of U.S. application Ser. No. 17/327,647, filed May 21, 2021, which is a divisional of U.S. application Ser. No. 16/265,853, filed Feb. 1, 2019, which claims the benefit of and priority to U.S. Provisional Application No. 62/754,495, filed Nov. 1, 2018, the entire contents of which are incorporated herein by reference.

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines ("VM") that appear and operate as independent computer devices to a connected user. The data center can create, maintain or delete virtual machines in a dynamic manner.

When the data center experiences network connectivity issues, poor network performance may result, resulting in lost data, or users being unable to provide quality services to their downstream customers, which may result in lost revenue and customer dissatisfaction. Troubleshooting network connectivity issues may be difficult to perform given the complexity of the networks in data centers. Production loss and inefficiencies with respect to computing resources can be exacerbated when the data center is unable to quickly isolate and correct the cause of a connectivity issue. It is with respect to these considerations and others that the disclosure made herein is presented.

SUMMARY

The disclosed embodiments describe technologies for data centers to diagnose network connectivity issues, particularly intermittent drops that may lead to poor network performance in the data center. This may allow data centers to more effectively adhere to operational objectives and at the same time improve operating efficiencies.

In many data centers, some link issues may cause patterns of delays or drops of a small percentage of data packets. Such issues can have a negative impact on performance and the user experience, and may be difficult to isolate. As traffic bandwidth increases and the data center scale grows, detecting and fixing these faulty links are becoming even more important. At the same time, identifying such links can be difficult, especially if the problem is silent and not reported in any data center counters. Moreover, packet losses might occur due to congestion instead of network equipment failures, making it more difficult to identify the faulty link. Even network failures might be transient. Finally, unfocused attempts to collect link data may result in a large amount of data that must be processed potentially without generating any actionable intelligence.

End-to-end network diagnostics in a datacenter can thus be difficult and costly. There may be multiple routers/switches and end hosts involved, and it may be difficult to diagnose where and if any packet loss is occurring. With the complex topologies that are commonly implemented in data centers, such as a Clos topology, there are multiple network paths and a number of devices/hops involved in any network communication. Any device/hop may drop packets intermittently. Attempts to find the intermittent device/interface may involve performing packet capture hop by hop, or by turning links off one by one to isolate the offending device. For example, an administrator may have to enable packet capture hop by hop on each of the switches and then correlate the captured traffic from different hops. Enabling packet capture hop by hop can be time consuming and may require that the operator have knowledge of the path that the traffic will take. Additionally, packet drop counters may not be targeted for any particular traffic of interest. Troubleshooting such issues can be time consuming, error prone, and risky. It can also be labor-intensive as the network operator may need to access each and every device and enable packet capture. The packet drop counters on router/switches are typically not specific enough for a given flow, thus not allowing for the identification of the source of the issue if the issue does not have a broad impact and only impacts a subset of a dataflow. Tools such as Netscan and Netbouncer may generally provide a way to detect lossy links or devices. However, such tools do not target specific customer traffic that may be experiencing issues. In a network with many links, it can be assumed that there is a non-zero chance that a number of these links are faulty and that not all link faults can be fixed simultaneously. Therefore, remedial actions need to be prioritized based on user impact and other criteria. However, it can be difficult to correlate user impact with faulty links. The data center can thus spend a considerable amount of time and effort attempting to isolate link faults, which can lead to extensive and unnecessary consumption of computing resources.

In various embodiments, methods and systems are disclosed for using latency information and statistics to diagnose link faults. In one embodiment, network path latencies may be used to determine if a network issue exists, and if so, a voting technique may be implemented to determine a likely faulty link. In some embodiments, latency detection functionality may be implemented in the virtual machine hosts, and a monitoring and voting function may be implemented to identify faulty links. For example, link faults may be diagnosed by using latency information and statistics for packets dropped in a TCP flow in a datacenter and identify the link that dropped the packet. This may be performed with low overhead and minimal or no changes to the network infrastructure. Additionally, some data centers may implement remote direct memory access (RDMA) to provide for direct memory access from the memory of one device into that of another without involving either operating system, allowing for high-throughput, low-latency networking. In some embodiments, components and functions used to implement RDMA in the data center may be used to provide additional latency information and statistics to diagnose link faults.

In some embodiments, using round trip latency may be used as an indication of whether a specific network path is healthy (for example, if it is above an expected threshold or significantly above the average latency that other connections to the same target are experiencing). Additionally, the latency may be measured with the assistance of network peripheral devices such as a network interface card (NIC). In some embodiments, the NIC may generate an acknowledgement without any software involvement, allowing for the reduction of sensitivity to software/host issues.

In some embodiments, user application traffic may be instrumented to measure the round-trip latencies of data packets. These round-trip latencies may be used as an indication for network path health. When a high latency is detected, a network traceroute may be queued for the route of the network connection that experienced the high latency. To ensure that the same route is traced, packets may be generated with the same 5-tuple (source IP, destination IP, protocol, source port, destination port) as the packets belonging to the connection.

In some embodiments, traceroute results and the latency values that triggered them may be collected from multiple hosts in the network, and the collected information may be used by the hosts to vote for the link which is most likely the source of the problems. To incorporate the latency in the voting, in one example the latency may be used to scale the number of votes that the traceroute assigns to each link. In some embodiments, the latency may be input to a machine learning system configured to tune the voting function. The votes from the various hosts can be collected by a central voting authority and analyzed to determine the most likely faulty link.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
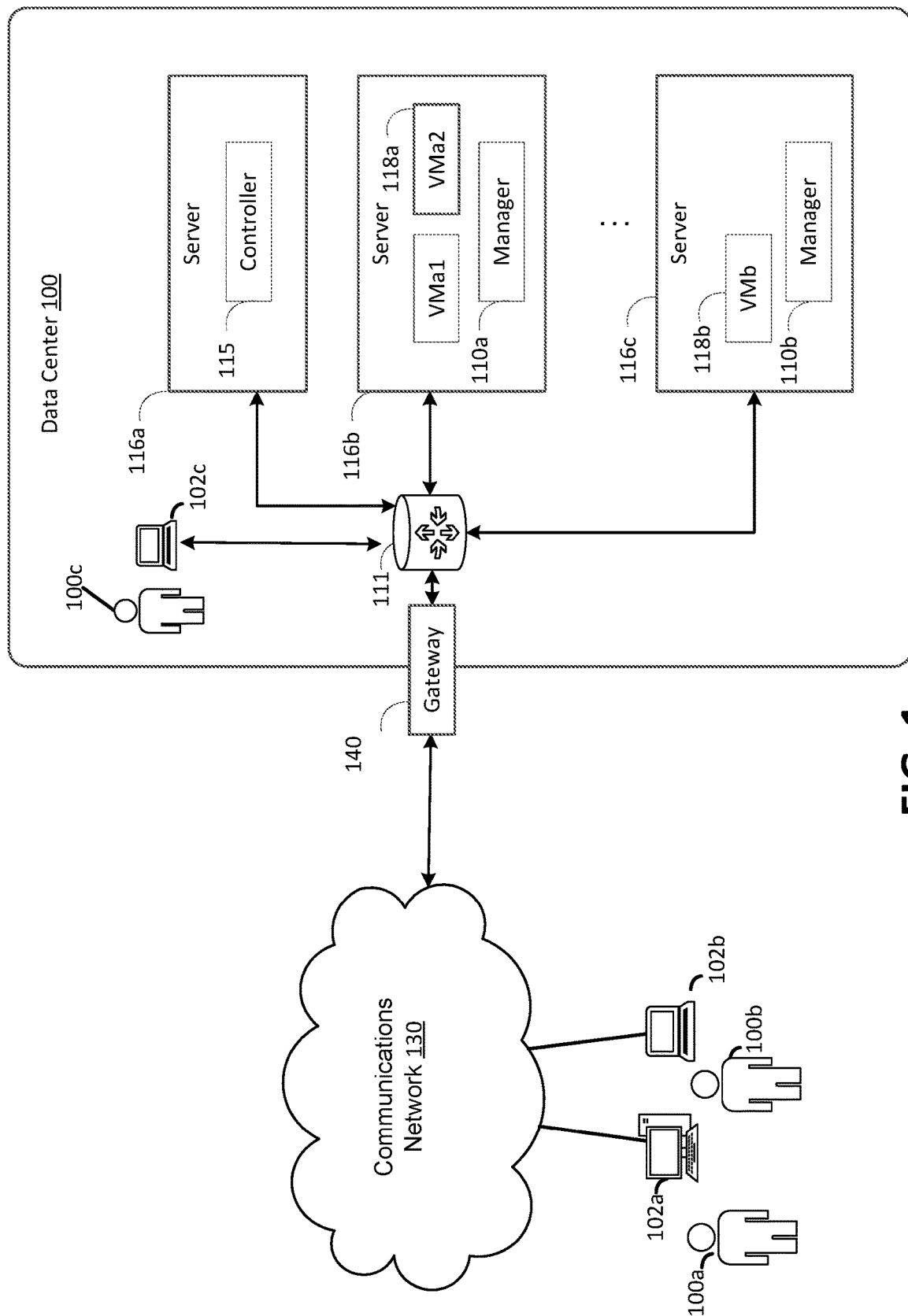
FIG. 1 is a diagram illustrating a data center in accordance with the present disclosure.

The following Detailed Description describes technologies for diagnosing network connectivity issues in data centers, including those that provide virtualized services. In such networks it may be difficult to capture information to troubleshoot and identify network issues. Such networks may comprise many network devices such as switches and other network devices. In some cases, mirroring techniques, where a copy of packets are sent to a network monitoring device, may increase network traffic which may cause performance issues. Furthermore, the effort to analyze and review the mirrored traffic can be significant as the volume of mirrored traffic increases. Additionally, when implementing RDMA, network devices may drop packets or delay transmission when their queues are full, which may not be known to the hosts.

The described techniques may be used to identify likely faults in links as well as failures in other network components such as switches and routers along the network route or in other networking hardware deployed in the path of network traffic (e.g., L2 encryptor or a long-haul relay circuit).

The disclosed techniques can detect failures in various components by performing the described voting scheme for such components. For example, switches or routers can be detected as the sum of the links connected to them. In some embodiments, votes may be summed for each line card in a switch individually. Active components may be flagged based on the route on which they are active using the voting scheme. In some cases, the active components may be indicated as multiple routes if the same component is handling multiple links and therefore cause correlated failures.

The present disclosure describes techniques for using network path latencies to determine if a network issue exists, and if so, identifying a likely faulty link. As used herein, a network path can include one or more physical links, which may be network devices such as a switch and can be implemented as hardware, software, or a combination. In some embodiments, latency detection functionality may be implemented in the virtual machine hosts, and a monitoring and voting function may be implemented to identify faulty links.

In one embodiment, when an RDMA transaction is issued, an ACK is returned. A time stamp is captured when a packet is sent, and another time stamp is captured when completed. Based on these two time stamps, it can be determined how long it took for the packet to reach the destination and receive the ACK. When a link is faulty, transmission delays for packet flows using that link may cause the time stamps to indicate a higher time difference. For example, a higher latency time value may result from a switch having a full queue, causing a packet transmission loss, a timeout of the packet TTL, and retransmission of the packet.

In one embodiment, a fault detection function may be implemented that is configured to determine, based on the latency values, that a probable fault has manifested in the network. In response, a link isolation function may be implemented to identify the likely faulty link. In one embodiment, when it is determined that a high latency indicates a likely link fault, a traceroute can be executed to determine the packet transit time between endpoints. In one embodiment, the UDP packet header for an RDMA transfer may be used to simulate an RDMA packet in a given connection. This procedure may be performed by multiple hosts, based on the assumption that multiple connections will be using the faulty link. Given that a number of traceroutes will cover the faulty link, it is likely that the faulty link can be observed through high latencies for routes that use the faulty link. In an embodiment, the hosts can determine a route that has a high observed transit time and cast a vote for a route with a faulty link. The votes from the various hosts can be collected by a central voting authority and analyzed to determine the most likely faulty link. In cases where an end host does not reply to traceroute requests, the analysis may include augmenting the analysis with prior knowledge of the network.

The determination of when to trigger the traceroutes may be based on the observed latencies in the network. The determination may also be based on one or more factors. For example, the length of transmit queues may be tracked and the traceroutes may be avoided or delayed when the queue size is large. The trigger may be based on observations of a selected subset of transactions, such as the top N % of transactions. Additionally, the triggering of traceroutes may be based on current bandwidth and expected transmission times, as well as the length of the routes associated with a given latency observation.

In some embodiments, where RDMA is implemented in the network, additional features may be implemented. In some cases, RDMA read responses may be lost, which may result in a high observed latency. In this case, the receiver may traceroute to the agent at the read target and have the target host run the traceroute to the receiver.

In some embodiments, a network path may overlap between a number of different routes. The number of votes may be reduced based on the overlap.

In some embodiments, the process for identification of a faulty link may be based on transmission latency information in addition to the voting information. For example, the voting information may be weighted based on the network transmission latency information.

In some cases, a longer route may be used in order to avoid a bad link, which may appear to have a high latency but in fact is due to the long route being taken to avoid the bad link. In such cases, the high latency due to the long route may be counted with the same weight as a high latency due to an intermittent link. In some scenarios, packets may not be required to only traverse either upwards or downwards in the network. Thus a packet can go from a T_0 to T_1 to another T_0 and T_1 switch before it reaches the T_2 layer switches. The following two types of routing may be accounted for:

a) Routing due to equal-cost multi-path (ECMP)
b) Routing due to bounce back routing which is primarily caused by a failed link in the network.

In one embodiment, flows that experience bounce back routing may be identified and accounted for separately when back tracking votes.

In one embodiment, the hosts of the network may be configured to run a traceroute when the latency for a transaction exceeds a value. The hosts need not have information about the overall topology of the network, and may base the traceroute decision based on the observed transaction latency. The value may be determined to limit the number of unnecessary traceroutes which increase traffic and workload.

In some embodiments, the value may be a fixed threshold such as a minimum value. In some embodiments, the value may be determined based on a statistically significant number of samples. In some embodiments, the value may be determined dynamically per connection. In some embodiments, the value may be adjusted based on the queue size. In some embodiments, the value may be determined based in part on congestion control data. For example, RDMA congestion control features may cause the transmission links to slow down when the network is congested. In such cases the value may be adjusted to account for the higher overall latencies.

In some embodiments, the votes may be received and analyzed at a centralized function. The centralized function may run on a dedicated server or group of servers, or on one or more virtual machines.

In some embodiments, hosts can locally and autonomously determine to initiate a traceroute and vote for a candidate faulty link.

In an RDMA framework, a high RDMA latency may correspond to TCP retransmissions in the TCP/IP framework. Additionally, the threshold may be variable and there may be multiple triggers for initiating traceroutes. The network may be a fat tree with bounce back routing. In one embodiment, the RDMA monitor driver may measure latencies and identify high latency packets.

Figure 2:
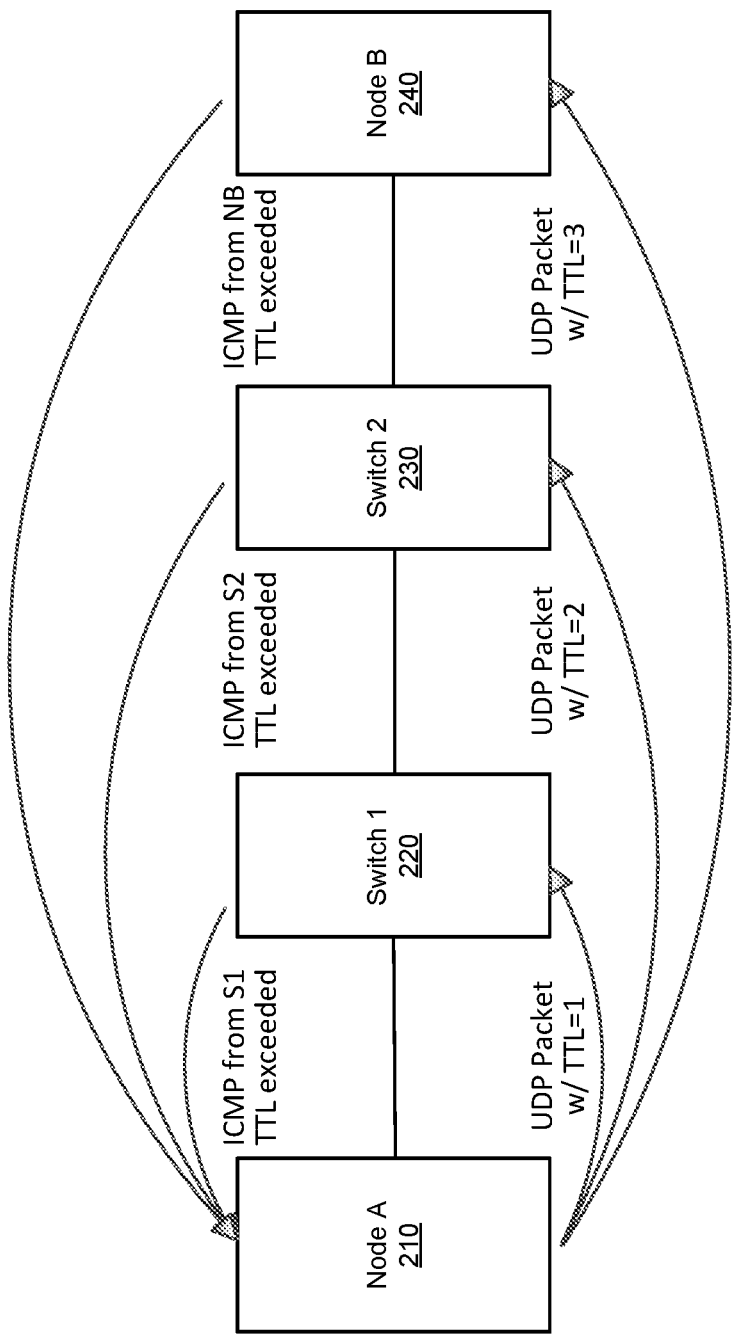
FIG. 2 is a diagram illustrating an example of a traceroute function in accordance with the present disclosure.

As discussed, a traceroute function may be implemented to determine high latency flow and identify and store routes. In general, a traceroute function is an example of a network diagnostic function that can be used to identify the network path that a data packet takes from a source node to a destination node. An example is illustrated by system 200 in FIG. 2. The traceroute function typically lists the intermediate network devices between nodes 210 and 240 (e.g., switches 220, 230, and other devices) that the data packet passes through until either the packet reaches its destination or fails to reach its destination and is discarded. In addition, the traceroute function typically collects information for the elapsed time taken for each hop from network device to network device. The host may thus be able to identify how the source and destination nodes are connected to each other and the latencies involved for each hop. The traceroute function operates by causing each network device along a network path to return a message such as an ICMP (Internet Control Message Protocol) message. A packet typically contains a time-to-live (TTL) value which specifies how many hops that the packet can traverse before it expires. Each time a packet passes through a network device, its TTL value is decremented by one, and if the TTL value reaches zero, the packet is discarded and a TTL Exceeded message is returned to the source node. In one example, the traceroute function may operate by initially sending a packet with a TTL value of one. The first network device along the path decrements the TTL to zero and discards the packet because the TTL has expired, and returns a TTL Exceeded message. The traceroute function identifies this network device as the first network device on the path to the destination. The traceroute function may then send a packet with a TTL value of two. The first network device along the path decrements the TTL to one and forwards the packet to the next network device in the path. The second network device along the path decrements the TTL to zero and discards the packet because the TTL has expired, and returns a TTL Exceeded error message. The traceroute function may identify this network device as the second network device on the path. The traceroute utility sends additional packets with a TTL of three, and then four, and so on, causing each network device along the path to return a TTL Exceeded message and thus discovering the intermediate network devices in the path until either the final destination is reached or the maximum TTL value is reached and the traceroute ends. The timestamp values returned for each router's TTL Exceeded message may be used to determine the latency values. The traceroute function typically operates over Internet Protocol (IP) networks using IP datagrams. In some embodiments the traceroute utility may send an ICMP Echo Request packet.

In one embodiment, recently identified routes may be cached and a maximum number of traceroutes per second may be limited in order to reduce sending too many ICMP packets and thus conserve computing resources. In one embodiment, an offline voting script may process multinode results.

FIG. 1 illustrates an example computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, a monitoring function may be implemented to record the path of connections (flows) that encounter one or more retransmissions and assign a proportional weight to each link on the path. A ranking of links may be determined that represents their relative drop rates. Using this ranking, the most likely cause of drops may be determined in each flow. One benefit of such a function is that changes to the existing networking infrastructure are not required. Additionally, no changes are required to user applications since the monitoring function runs independently. Another benefit is that in-band failures may be detected without bringing systems offline.

In some embodiments, the monitoring function may be configured to identify faulty links in the presence of noise (e.g., lone packet drops). Additionally, the monitoring function may be configured to minimize overhead. For example, the monitoring function may be configured to minimize impact to routers and not send too many traceroutes since traceroute responses are handled by control-plane CPUs of routers which may have limited capacity.

While many of the described examples are illustrated in the context of analyzing infrastructure traffic such as connections to services such as storage, the described techniques may be used in other contexts as well.

There are a number of ways that may be employed to identify the cause of packet drops. For example, switch counters can be monitored. However, this method may be unreliable and monitoring large numbers of switches at a fine time granularity may not be scalable. New hardware capabilities may be used to gather more information. However, correlating this data with each retransmission reliably may be difficult. Tools such as PingMesh may send probe packets and monitor link status. However, sending too many probes may create unacceptable overhead whereas reducing the probing rate may leave temporal and spatial gaps in coverage. Additionally, the probe traffic may not capture what the end user and network flows observe. By using data traffic as probe traffic, the system introduces minimal monitoring overhead.

Other methods may insert a special tag in every packet and have switches mirror tagged packets to special collection servers. Thus, if a tagged packet is dropped, the link on which it happened can be determined. However, the overhead on such a scheme may be costly or infeasible.

In the described embodiments, the traceroute function may rely on receiving ICMP TTL exceeded messages back from the switches. These messages are generated by the control-plane, i.e., the switch CPU. To avoid overloading the CPU, the rate of ICMP responses may be capped, for example to a limit such as 100 per second. However, this may limit the number of flows that can be actively tracked.

It may be observed that typically when there are packet drops, multiple flows will experience drops. If only the path of those flows that have retransmissions are tracked, and each link on the path of such a flow are assigned a vote of 1/h, where h is the path length, and the votes during a given period are summed, then the top-voted links may indicate the links that are dropping packets. The described embodiments may provide a ranking of the links in terms of their drop rates, i.e., if link A has a higher vote than B, then it is also dropping more packets with a high probability. By analyzing the vote data, the links with the most impact to a given application/user may be determined based on which links impact a particular flow.

Figure 5:
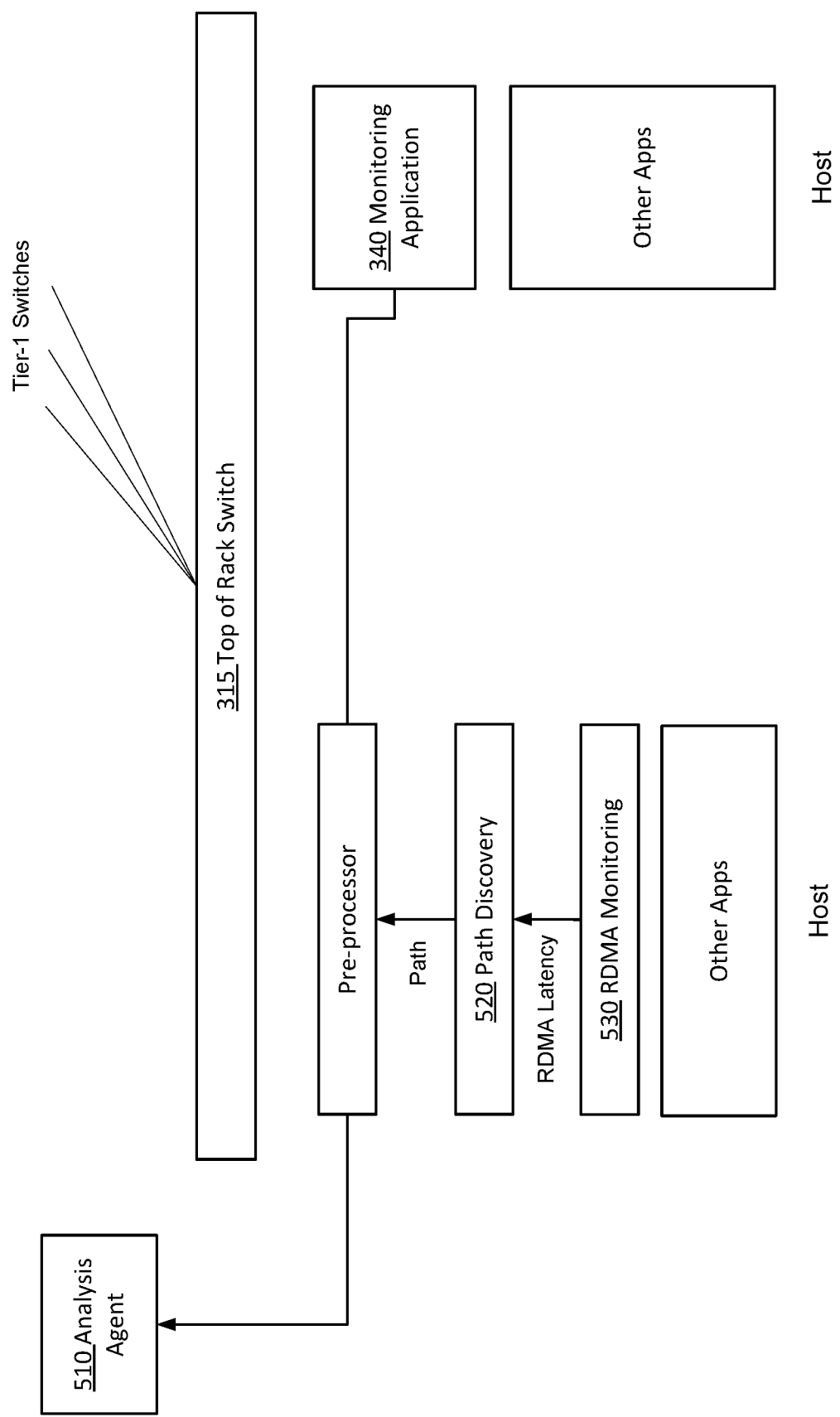
FIG. 5 is a diagram illustrating an example architecture in accordance with the present disclosure.

FIG. 5 illustrates an example architecture of a system for identifying fault links in an RDMA context. The architecture may be deployed alongside other applications on each end-host as a user-level process running in the host OS. In one example, three agents may be implemented for RDMA monitoring 530, path discovery 520, and analysis 510. The RDMA monitoring function 530 may be configured to detect retransmissions at each end-host. An event tracing function (not shown) may be configured to notify the agent when a retransmission occurs in an active flow. In response to a retransmission, the RDMA monitoring function 530 may trigger the path discovery agent 520 which may be configured to identify the flow's path to the destination IP (DIP).

At the end-hosts, a voting scheme may be implemented based on the paths of flows that had retransmissions. At regular intervals, for example in intervals of 30, the votes may be tallied by the analysis agent 510 to determine the top-voted links. The path discovery agent 520 may use traceroute packets to find the path of flows that have retransmissions. These packets may be used solely to identify the path of a flow. Monitoring function 340 may be configured to perform various network diagnosis functions and identify problematic links. The problematic links may be determined based on identified physical links and information received from the hosts. The host information may be based on network link path latency information for one or more network paths in the networked computing environment. The existence of a probable faulty component may be determined based on the network link path latency information. In response to the determination, physical links for a network route path associated with the probable faulty component may be identified. Latencies for the identified physical links may be collected from multiple hosts in the networked computing environment. The hosts may provide votes for physical links and other information that is indicative of likely sources of the probable faulty component.

Figure 3:
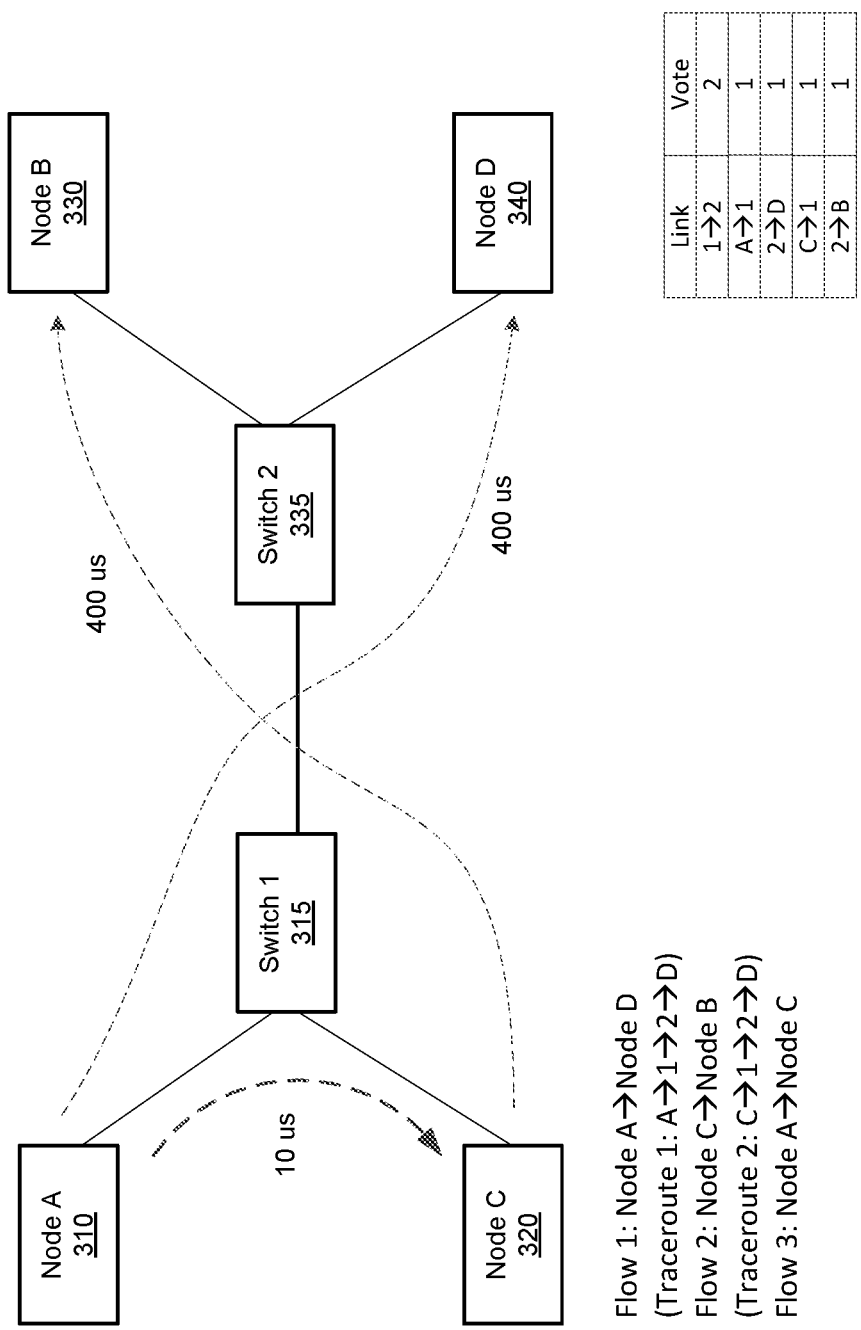
FIG. 3 is a diagram illustrating an example voting result in accordance with the present disclosure.

FIG. 3 illustrates one example of traceroutes and voting based on the traceroutes. In this example, the latency from Node A 310 to Node C 320 as indicated by traceroutes is 10 microseconds. The latency from Node C 320 to Node B 330 as indicated by traceroutes is 400 microseconds, and the latency from Node A 310 to Node D 340 as indicated by traceroutes is 400 microseconds. Because of the high observed latency of 400 microseconds from Node A to Node D, as well as from Node C to Node B, the common link is from Switch 1 315 to Switch 2 335, and thus this link may receive 2 votes. The link from Node A 310 to Switch 1 315 may also receive one vote due to the link being a part of the path from Node A 310 to Node D 340 which is seen to have a high latency of 400 microseconds. However, because of the high observed latency of 400 microseconds from Node A to Node D, as well as from Node C to Node B which includes the common link Switch 1 315 to Switch 2 335, this link receives two votes, which allows this link to be more visibly suspect via the voting mechanism.

Figure 4:
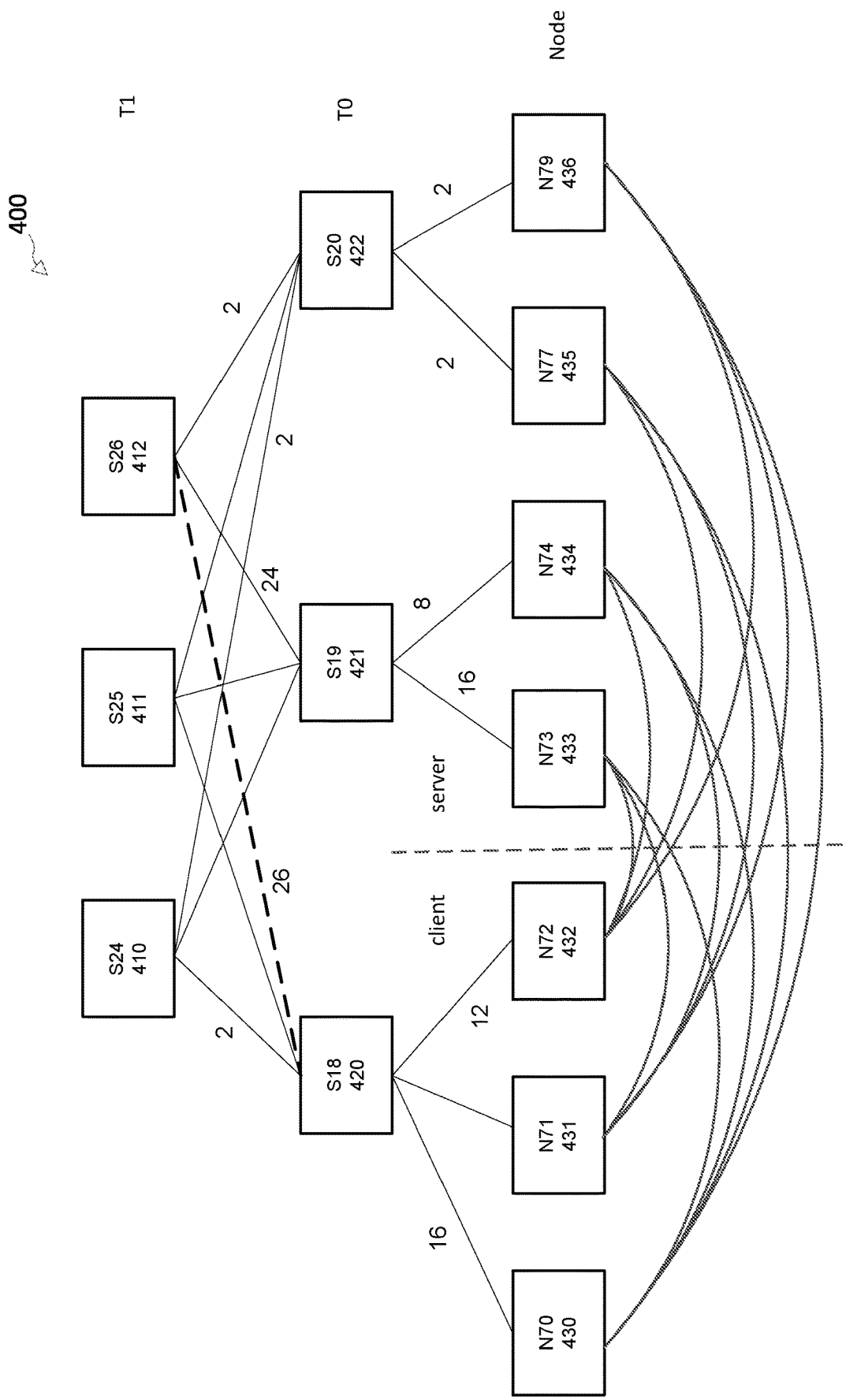
FIG. 4 is a diagram illustrating example RDMA flows.

FIG. 4 illustrates an example networked environment 400 where packet drops are manifested between switches S18 420 and S26 412. As shown, multiple connections between network components result in multiple paths between two given nodes. Additionally, 12 RDMA flows are shown between the nodes. The packet drops between switches S18 420 and S26 412 may result in latencies that may be observed by at least nodes N70 430, N71 431, and N72 432. As shown in this example, the S18 420 and S26 412 link may receive 26 votes which is the highest number of votes for links in the example network.

In one example, where a Clos topology is implemented and assuming that hosts under a top of the rack switch (ToR) communicate with hosts under a different ToR uniformly at random, the rate of ICMP packets sent by any switch due to a traceroute is below Tmax if the rate Ct at which hosts send traceroutes is upper bounded as $$C_t \leq \frac{T_{max}}{n_0 H} \min\left[n_1, \frac{n_2(n_0 n_{pod} - 1)}{n_0(n_{pod} - 1)}\right], \qquad (1)$$

where n0, n1, and n2, are the numbers of ToR, T1, and T2 switches respectively, $n_{pod}$ is the number of pods, and H is the number of hosts under each ToR. The upper bound of $C_t$ may, in one example be 10. As long as hosts do not have more than 10 flows with retransmissions per second, the number of traceroutes sent will not go above Tmax. $C_t$ may be used as a threshold to limit the traceroute rate of each host. In some embodiments, two independent rate limits may be implemented, one set at the host and the other set by network operators on the switch ($T_{max}$). Additionally, the analysis agent may trigger path discovery for a given connection no more than once every epoch to further limit the number of traceroutes.

Some data centers may use ECMP. All packets of a given flow, defined by the five-tuple, follow the same path. Thus, traceroute packets should have the same five-tuple as the flow to be traced. To ensure this, load balancers may be accounted for. TCP connections may be initiated by first establishing a virtual IP (VIP) and the SYN packet containing the VIP as destination goes to a software load balancer (SLB) which assigns that flow to a physical destination IP (DIP) and a service port associated with that VIP. The SLB then sends a configuration message to the virtual switch (vSwitch) in the hypervisor of the source virtual machine that registers that DIP with that vSwitch. The destination of all subsequent packets in that flow have the DIP as their destination and do not go through the SLB. For the path of the traceroute packets to match that of the data packets, its header should contain the DIP and not the VIP. Thus, before tracing the path of a flow, the path discovery agent first queries the SLB for the VIP-to-DIP mapping for that flow. An alternative is to query the vSwitch. In the instances where the failure also results in connection termination, the mapping may be removed from the vSwitch table. In some cases, the SLB may be queried. In some cases, the TCP connection establishment may fail due to packet loss. Path discovery may not be triggered for such connections. Additionally, path discovery may not be triggered when the query to the SLB fails to avoid tracerouting the internet.

In some cases, the traceroute may fail. This may happen, for example, if the link drop rate is high or due to a blackhole. In this case, the faulty link is directly identified and the analysis engine may use such partial traceroutes. In other cases, routing may change by the time traceroute starts. If BGP is used, a lossy link may cause one or more BGP sessions to fail, triggering rerouting. In this case, the traceroute packets may take a different path than the original connection. However, RTTs in a datacenter are typically less than 1 or 2 ms, so TCP retransmits a dropped packet quickly. The ETW framework notifies the monitoring function immediately, which invokes the path discovery agent. The only additional delay is the time required to query the SLB to obtain the VIP-to-DIP mapping, which is typically less than a millisecond. Thus, as long as paths are stable for a few milliseconds after a packet drop, the traceroute packets will follow the same path as the flow and the probability of error is low.

IPs may be mapped from the traceroutes to the switch names. In some embodiments the path discovery implementation may be as follows: Once the RDMA monitoring function notifies the path discovery agent that a flow has suffered a retransmission, the path discovery agent checks its cache of discovered path for that epoch and if needed, queries the SLB for the DIP. It then sends 15 appropriately configured TCP packets with TTL values ranging from 0-15. In order to disambiguate the responses, the TTL value is also encoded in the IP ID field. This allows for concurrent traceroutes to multiple destinations. The TCP packets deliberately carry a bad checksum so that they do not interfere with the ongoing connection.

The analysis agent may implement a voting scheme. If a flow is associated with a retransmission, its links may be voted as bad. Each vote has a value that may be tallied at the end of every epoch, providing a natural ranking of the links. The value of good votes may be set to 0 (if a flow has no retransmission, no traceroute is needed). Bad votes may be assigned a value of hl, where his the number of hops on the path, since each link on the path is equally likely to be responsible for the drop. The ranking obtained after compiling the votes allows identification of the most likely cause of drops on each flow: links ranked higher have higher drop rates (see Theorem 2). To further guard against high levels of noise, knowledge of the topology can be used to adjust the links votes. Namely, the most voted link $l_{max}$ may be iteratively picked and the portion of votes obtained by all other links due to failures on $l_{max}$ may be estimated. This estimate is obtained for each link k by (i) assuming all flows having retransmissions and going through $l_{max}$ had drops due to $l_{max}$ and (ii) finding what fraction of these flows go through k by assuming ECMP distributes flows uniformly at random.

---

Algorithm 1 Finding the most problematic links in the network.

1: $\mathcal{L} \leftarrow$ Set of all links
2: $\mathcal{P} \leftarrow$ Set of all possible paths
3: $v(l_i) \leftarrow$ Number of votes for $l_i \in \mathcal{L}$
4: $\mathcal{B} \leftarrow$ Set of most problematic links
5: $l_{max} \leftarrow$ Link with maximum votes in $\forall l_i \in \mathcal{L} \cap \mathcal{B}^c$
6: while $v(l_{max}) \geq 0.01 \; (\sum_{l_i \in \mathcal{L}} v(l_i))$ do
7: $\quad l_{max} \leftarrow \text{argmax}_{l_i \in \mathcal{L} \cap \mathcal{B}^c} v(l_i)$
8: $\quad \mathcal{B} \leftarrow \mathcal{B} \cup \{l_{max}\}$
9: $\quad$ for $l_i \in \mathcal{L} \cap \mathcal{B}^c$ do
10: $\quad\quad$ if $\exists \; p_i \in \mathcal{P}$ s.t. $l_i \in p_i$ & $l_{max} \in p_i$ then
11: $\quad\quad\quad$ Adjust the score of $l_i$
12: $\quad\quad$ end if
13: $\quad$ end for
14: end while
15: return $\mathcal{B}$

---

In one embodiment, failed links may be detected using Algorithm 1. The algorithm sorts the links based on their votes and uses a threshold to determine if there are problematic links. If so, it adjusts the votes of all other links and repeats until no link has votes above the threshold. In Algorithm 1, a threshold of 1% of the total votes cast may be used. Higher values may reduce false positives but increase false negatives. Switch failures may be detected in a similar fashion by applying votes to switches instead of links.

In its voting scheme, failed connections may contribute to increase the tally of both good and bad links. Moreover, in a large data center, occasional, lone, and sporadic drops can occur due to good links. These failures may be akin to noise and can cause inaccuracies in any detection system. As illustrated herein, the likelihood such errors may be small. Given a Clos Topology:

Theorem 2. For $n_{pod} \geq \frac{n_0}{n_1} + 1$, 007 will find with probability $1 - 2e^{-\Theta(N)}$ the $k < \frac{n_2(n_0 n_{pod} - 1)}{n_0(n_{pod} - 1)}$ bad links that drop packets with probability $p_b$ among good links that drop packets with probability $p_g$ if $$p_g \leq (n_n \alpha)^{-1} [1 - (1 - p_b)^{n_l}],$$

where N is the total number of flows between hosts, $n_l$ and $n_n$ are lower and upper bounds, respectively, on the number of packets per connection, and $$\alpha = \frac{n_0(4n_0 - k)(n_{pod} - 1)}{n_2(n_0 n_{pod} - 1) - n_0(n_{pod} - 1)k}, \quad (2)$$

Theorem 2 states that under mild conditions, links with higher drop rates are ranked higher. Since a single flow is unlikely to go through more than one failed link in a network with thousands of links, the most likely cause of packet drops on each flow may be found.

A corollary of Theorem 2 is that in the absence of noise (pg=0), all bad links may be found with high probability. In the presence of noise, the bad links can be identified as long as the probability of dropping packets on non-failed links is low enough (the signal-to-noise ratio is large enough).

Another result of Theorem 2 is that it establishes that the probability of errors diminishes exponentially with N, so that even with the limits imposed by Theorem 1 the failed links can be accurately identified. The conditions in Theorem 2 are sufficient but not necessary.

In some embodiments, the optimal sets of failed links may be determined by finding the most likely cause of drops given the available evidence. In one embodiment, the least number of links may be determined that explain all failures, based on the flows that had packet drops and their paths. This can be analyzed as an optimization problem called the binary program. Explicitly, minimize $\|p\|_0$ subject to $Ap \geq s$ $p \in \{0,1\}^L$ where A is a C×L routing matrix; s is a C×1 vector that collects the status of each flow during an epoch (each element of s is 1 if the connection experienced at least one retransmission and 0 otherwise); L is the number of links; C is the number of connections in an epoch; and denotes the number of nonzero entries of the vector p. If the solution is p*, then the i-th element of p* indicates whether the binary program estimates that link i failed.

Figure 6:
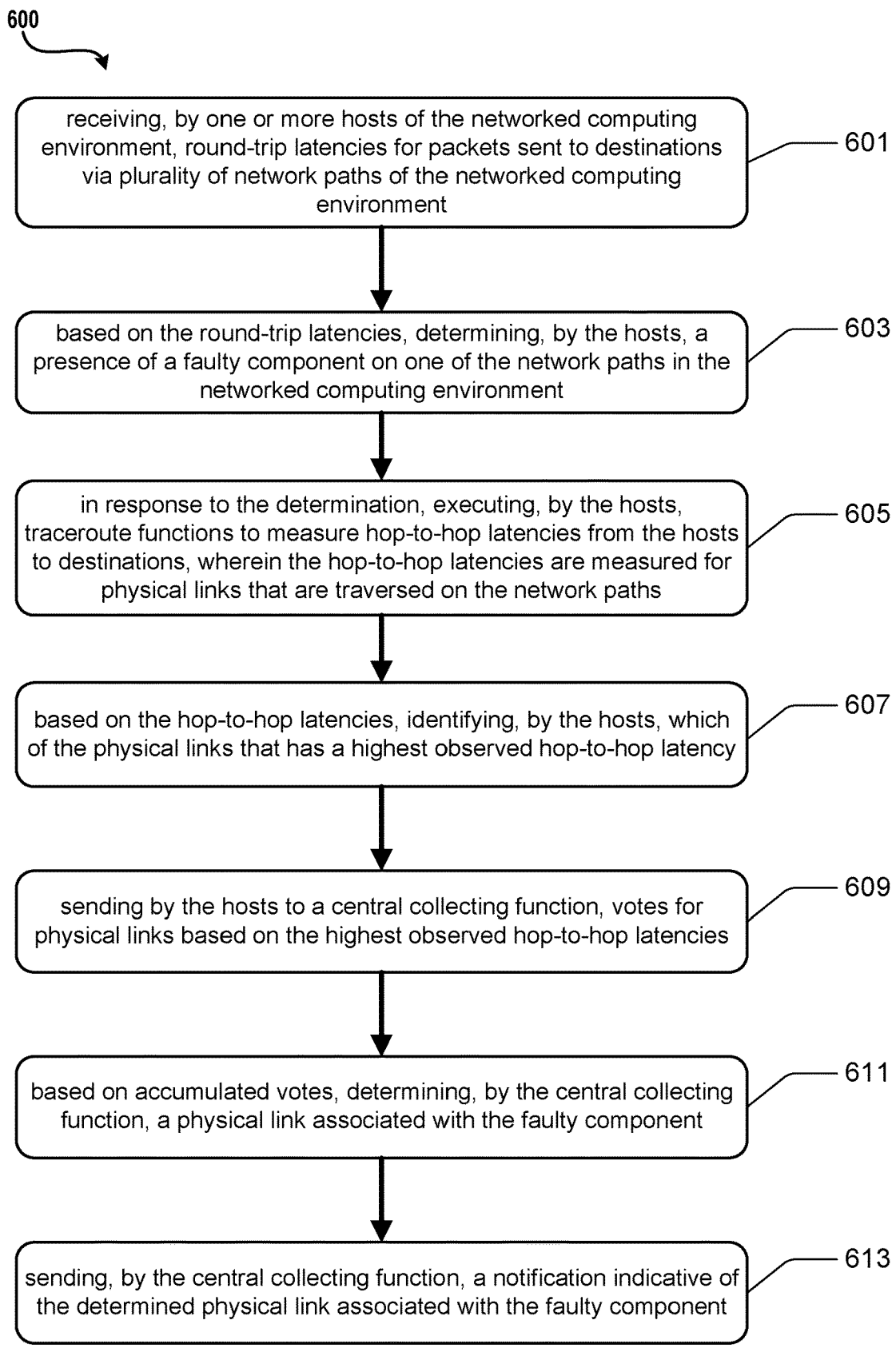
FIG. 6 is a flowchart depicting an example procedure for diagnosing network issues in accordance with the present disclosure.

Turning now to FIG. 6, illustrated is an example operational procedure for identifying faulty links in a virtualized computing environment in accordance with the present disclosure. Such an operational procedure may provide for identifying faulty links and can be provided by functions illustrated, for example, in FIGS. 1-5. The operational procedure may be implemented in a system comprising one or more computing devices. Referring to FIG. 6, operation 601 illustrates receiving, by one or more hosts of the networked computing environment, round-trip latencies for packets sent to destinations via plurality of network paths of the networked computing environment.

Operation 601 may be followed by operation 603. Operation 603 illustrates based on the round-trip latencies, determining, by the hosts, a presence of a faulty component on one of the network paths in the networked computing environment.

Operation 603 may be followed by operation 605. Operation 605 illustrates in response to the determination, executing, by the hosts, traceroute functions to measure hop-to-hop latencies from the hosts to destinations, wherein the hop-to-hop latencies are measured for physical links that are traversed on the network paths.

Operation 605 may be followed by operation 607. Operation 607 illustrates based on the hop-to-hop latencies, identifying, by the hosts, which of the physical links that has a highest observed hop-to-hop latency.

Operation 607 may be followed by operation 609. Operation 609 illustrates sending by the hosts to a central collecting function, votes for physical links based on the highest observed hop-to-hop latencies.

Operation 609 may be followed by operation 611. Operation 611 illustrates based on accumulated votes, determining, by the central collecting function, a physical link associated with the faulty component.

Operation 611 may be followed by operation 613. Operation 613 illustrates sending, by the central collecting function, a notification indicative of the determined physical link associated with the faulty component.

Figure 7:
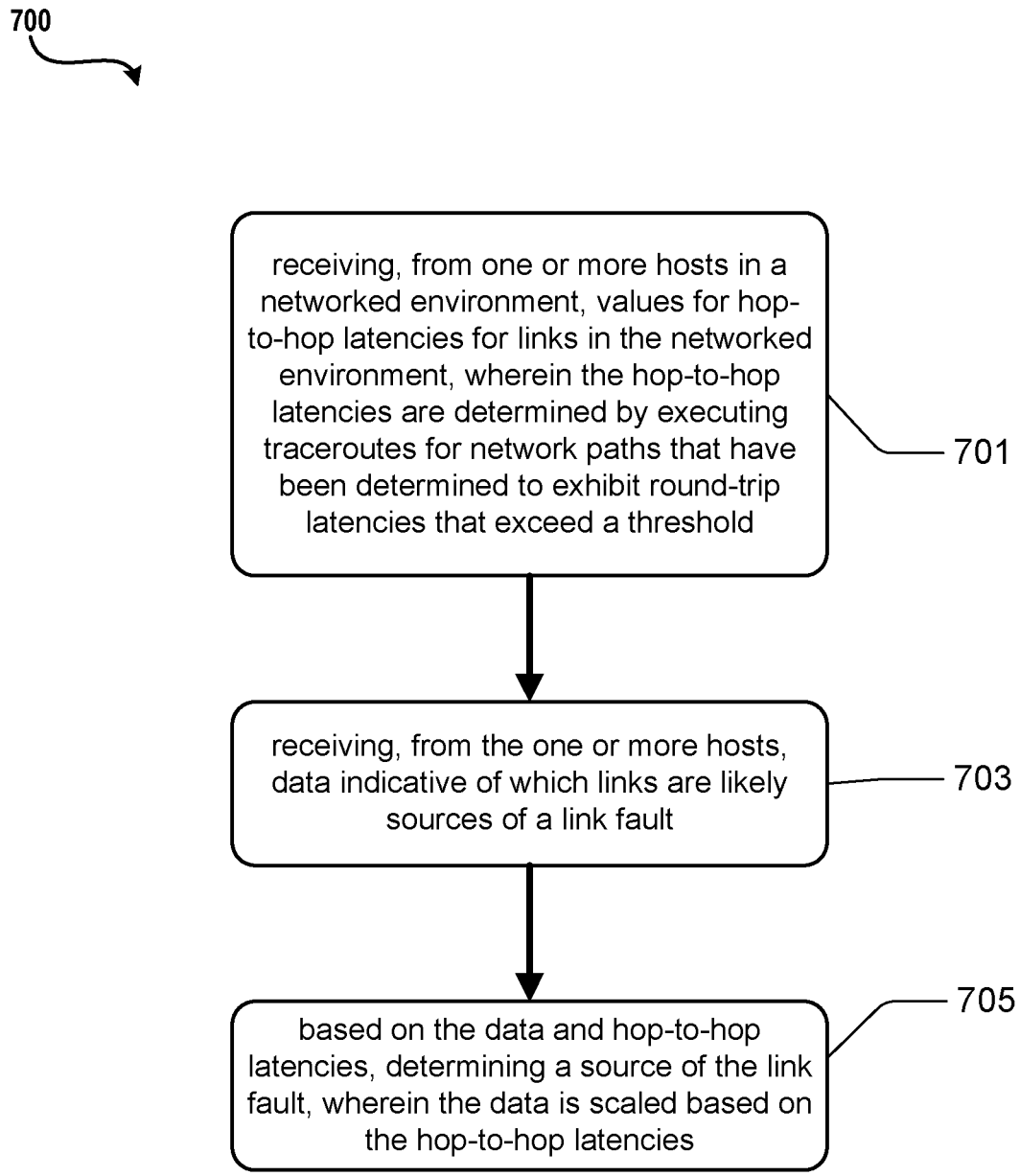
FIG. 7 is a flowchart depicting an example procedure for diagnosing network issues in accordance with the present disclosure.

Referring to FIG. 7, illustrated is another example operational procedure for identifying faulty links in a networked environment. Such an operational procedure may provide for identifying faulty links and can be provided by functions illustrated, for example, in FIGS. 1-5. The operational procedure may be implemented in a system comprising one or more computing devices. Referring to FIG. 7, operation 701 illustrates receiving, from one or more hosts in a networked environment, values for hop-to-hop latencies for links in the networked environment, wherein the hop-to-hop latencies are determined by executing traceroutes for network paths that have been determined to exhibit round-trip latencies that exceed a threshold.

Operation 701 may be followed by operation 703. Operation 703 illustrates receiving, from the one or more hosts, data indicative of which links are likely sources of a link fault.

Operation 703 may be followed by operation 705. Operation 705 illustrates based on the data and hop-to-hop latencies, determining a source of the link fault, wherein the data is scaled based on the hop-to-hop latencies.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
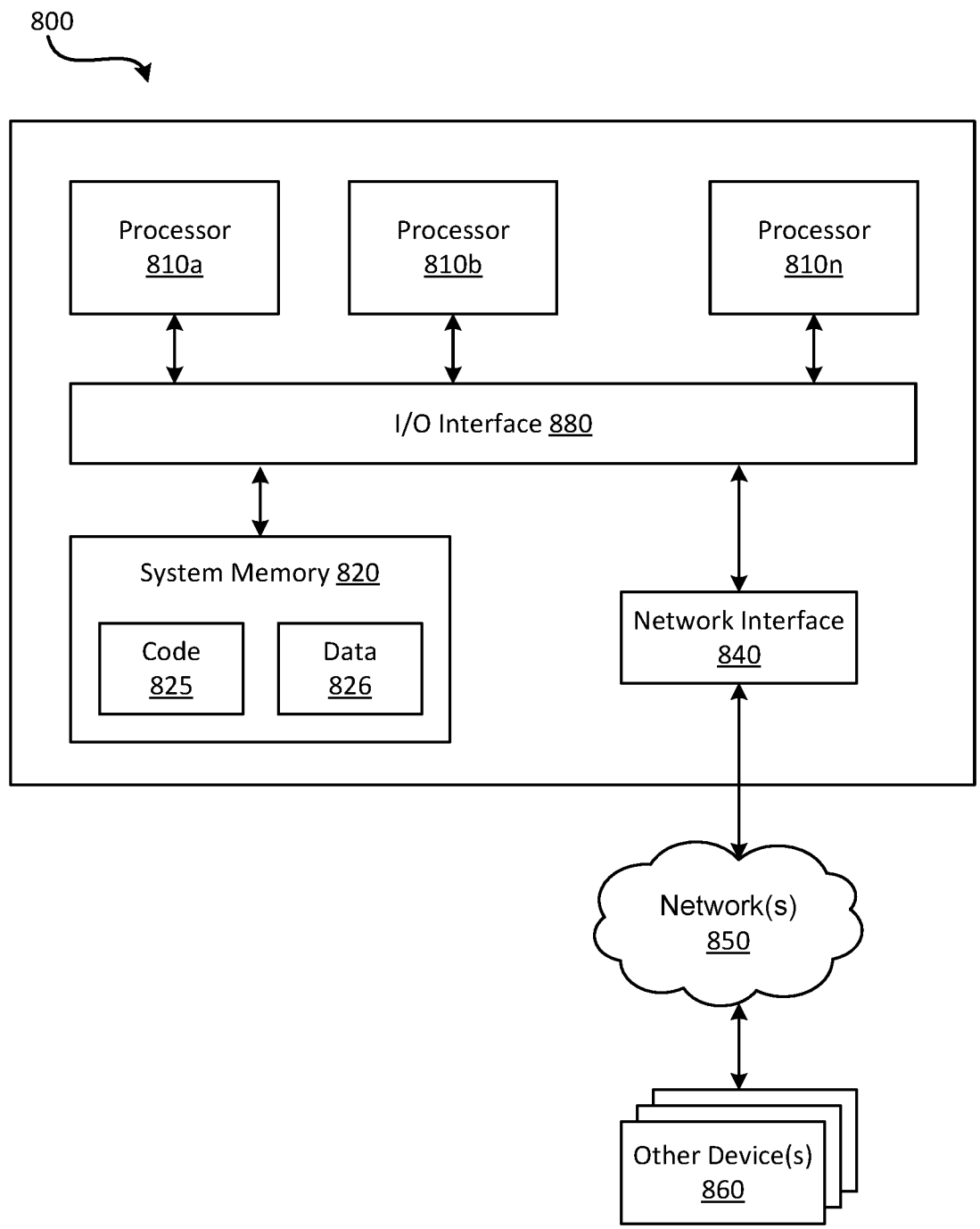
FIG. 8 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between the processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

The disclosure presented herein encompasses the subject matter set forth in the following example clauses.

Example Clause A, method for identifying faulty links in a networked computing environment comprising one or more computing devices and one or more network devices, the method comprising:

receiving, by one or more hosts of the networked computing environment, round-trip latencies for packets sent to destinations via plurality of network paths of the networked computing environment;

based on the round-trip latencies, determining, by the hosts, a presence of a faulty component on one of the network paths in the networked computing environment;

in response to the determination, executing, by the hosts, traceroute functions to measure hop-to-hop latencies from the hosts to destinations, wherein the hop-to-hop latencies are measured for physical links that are traversed on the network paths;

based on the hop-to-hop latencies, identifying, by the hosts, which of the physical links that has a highest observed hop-to-hop latency;

sending by the hosts to a central collecting function, votes for physical links based on the highest observed hop-to-hop latencies;

based on accumulated votes, determining, by the central collecting function, a physical link associated with the faulty component; and sending, by the central collecting function, a notification indicative of the determined physical link associated with the faulty component.

Example Clause B, the method of Example Clause A, wherein the round-trip latencies are determined using RDMA transaction time stamps.

Example Clause C, the method of any one of Example Clauses A through B, wherein the determining the physical link associated with the faulty component is further based on individual latency values associated with the physical links.

Example Clause D, the method of any one of Example Clauses A through C, wherein determining the presence of the faulty component is based on a value for an observed round-trip latency.

Example Clause E, the method of any one of Example Clauses A through D, further comprising scaling a number of votes associated with each physical link.

Example Clause F, a system, comprising:

one or more processors; and a memory in communication with the one or more processors, the memory having computer-readable instructions stored thereupon that, when executed by the one or more processors, cause the system to perform operations comprising:

receiving round-trip latencies to destinations over one or more network paths communicatively coupled to the system;

determining whether at least one of the round-trip latencies exceeds a threshold or exceeds characteristic latencies for connections to the same destination;

in response to the determination, executing a traceroute function to measure hop-to-hop latencies for physical links on network paths where the round-trip latencies exceeds the threshold or exceeds the characteristic latencies for connections to the same destination;

based on the hop-to-hop latencies, identifying one of the physical links that has a highest observed hop-to-hop latency; and sending, to a central collecting function, information indicative of the identified physical link for determination of a location of a faulty component.

Example Clause G, the system of Example Clause F, wherein the determining whether at least one of the round-trip latencies exceeds a threshold or exceeds characteristic latencies for connections to the same destination is based on a value for an observed round-trip latency.

Example Clause H, the system of any one of Example Clauses F through G, wherein the value is a fixed threshold.

Example Clause I, the system of any one of Example Clauses F through H, wherein the value is a minimum value.

Example Clause J, the system of any one of Example Clauses F through I, wherein the value is determined based on a statistically significant number of samples.

Example Clause K, the system of any one of Example Clauses F through J, wherein the value is determined dynamically per connection.

Example Clause L, the system of any one of Example Clauses F through K, wherein the value is adjusted based on a network queue size.

Example Clause M, the system of any one of Example Clauses F through L, wherein the value is determined based in part on congestion control data.

Example Clause N, a computer-readable storage medium having computer-executable instructions stored thereupon which, when executed by one or more processors of a computing device, cause the computing device to perform operations comprising:
  receiving, from one or more hosts in a networked environment, values for hop-to-hop latencies for links in the networked environment, wherein the hop-to-hop latencies are determined by executing traceroutes for network paths that have been determined to exhibit round-trip latencies that exceed a threshold;
  receiving, from the one or more hosts, data indicative of which links are likely sources of a link fault; and
  based on the data and hop-to-hop latencies, determining a source of the link fault, wherein the data is scaled based on the hop-to-hop latencies.

Example Clause O, the computer-readable storage medium of Example Clause O, wherein the round-trip latencies are determined using RDMA transaction time stamps.

Example Clause P, the computer-readable storage medium of Example Clause O, wherein the determining the source of the link fault is further based on an overlap of the network paths.

Example Clause Q, the computer-readable storage medium of any of Example Clauses O through P, wherein the determining a source of the link fault is further based on associated latency values.

Example Clause R, the computer-readable storage medium of any one of Example Clauses O through Q, wherein the threshold is a fixed threshold or a minimum value.

Example Clause S, the computer-readable storage medium of any one of Example Clauses O through R, further comprising scaling the data based on the hop-to-hop latencies.

Example Clause T, the computer-readable storage medium of any one of Example Clauses O through S, wherein the threshold is determined based on a statistically significant number of samples, determined dynamically per connection, based on a network queue size, or determined based in part on congestion control data.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for identifying faulty links in a networked computing environment comprising a plurality of computing devices and network devices, the method comprising:
  receiving round-trip latencies for network paths of the networked computing environment;
  based on the round-trip latencies, determining a presence of a fault in the networked computing environment;
  in response to the determination, executing traceroute functions to measure hop-to-hop latencies for physical links that are traversed on network paths of the networked computing environment;

receiving, from a plurality of hosts in the networked computing environment, votes that are indicative of which of the physical links are likely to be associated with the fault, wherein the votes are determined based on the hop-to-hop latencies; and based on the votes, determining which of the physical links are associated with the fault.

2. The method of claim 1, wherein the round-trip latencies are determined using RDMA transaction time stamps.

3. The method of claim 1, wherein the determining which of the physical links are associated with the fault is further based on individual latency values associated with the physical links.

4. The method of claim 1, wherein determining the presence of the fault is based on a value for an observed round-trip latency.

5. The method of claim 1, further comprising scaling a number of votes associated with each physical link.

6. The method of claim 1, wherein determining the presence of the fault comprises determining whether at least one of the round-trip latencies exceeds a threshold.

7. The method of claim 6, wherein the determining whether the at least one of the round-trip latencies exceeds a threshold is based on a value for an observed round-trip latency.

8. The method of claim 7, wherein the value is a fixed threshold.

9. The method of claim 7, wherein the value is a minimum value.

10. The method of claim 7, wherein the value is determined based on a statistically significant number of samples.

11. The method of claim 7, wherein the value is determined dynamically per connection.

12. The method of claim 7, wherein the value is adjusted based on a network queue size.

13. The method of claim 7, wherein the value is determined based in part on congestion control data.

14. A system, comprising:
one or more processors; and
a memory in communication with the one or more processors, the memory having computer-readable instructions stored thereupon that, when executed by the one or more processors, cause the system to perform operations comprising:
receiving round-trip latencies for network paths of the networked computing environment;
based on the round-trip latencies, determining a presence of a fault in the networked computing environment;
in response to the determination, executing traceroute functions to measure hop-to-hop latencies for physical links that are traversed on network paths of the networked computing environment;
receiving, from a plurality of hosts in the networked computing environment, votes that are indicative of which of the physical links are likely to be associated with the fault, wherein the votes are determined based on the hop-to-hop latencies; and
based on the votes, determining which of the physical links are associated with the fault.

15. The system of claim 14, wherein the determining the presence of the fault comprises determining whether at least one of the round-trip latencies exceeds a threshold.

16. The system of claim 15, wherein the threshold is one or more of a fixed threshold or a minimum value.

17. The system of claim 15, wherein the threshold is determined based on a number of samples or congestion control data.

18. The system of claim 15, wherein the threshold is determined dynamically per connection or adjusted based on a network queue size.

19. A non-transitory computer-readable storage medium having computer-executable instructions stored thereupon which, when executed by one or more processors of a computing device, cause the computing device to perform operations comprising:
receiving round-trip latencies for network paths of the networked computing environment;
based on the round-trip latencies, determining a presence of a fault in the networked computing environment;
in response to the determination, executing traceroute functions to measure hop-to-hop latencies for physical links that are traversed on network paths of the networked computing environment;
receiving, from a plurality of hosts in the networked computing environment, votes that are indicative of which of the physical links are likely to be associated with the fault, wherein the votes are determined based on the hop-to-hop latencies; and
based on the votes, determining which of the physical links are associated with the fault.

20. The non-transitory computer-readable storage medium of claim 19, wherein the determining which of the physical links are associated with the fault is based on an overlap of the network paths or based on associated latency values.

* * * * *